March 17, 1953 L. L. LAKATOS 2,632,104
GATING CIRCUIT
Filed Feb. 19, 1952
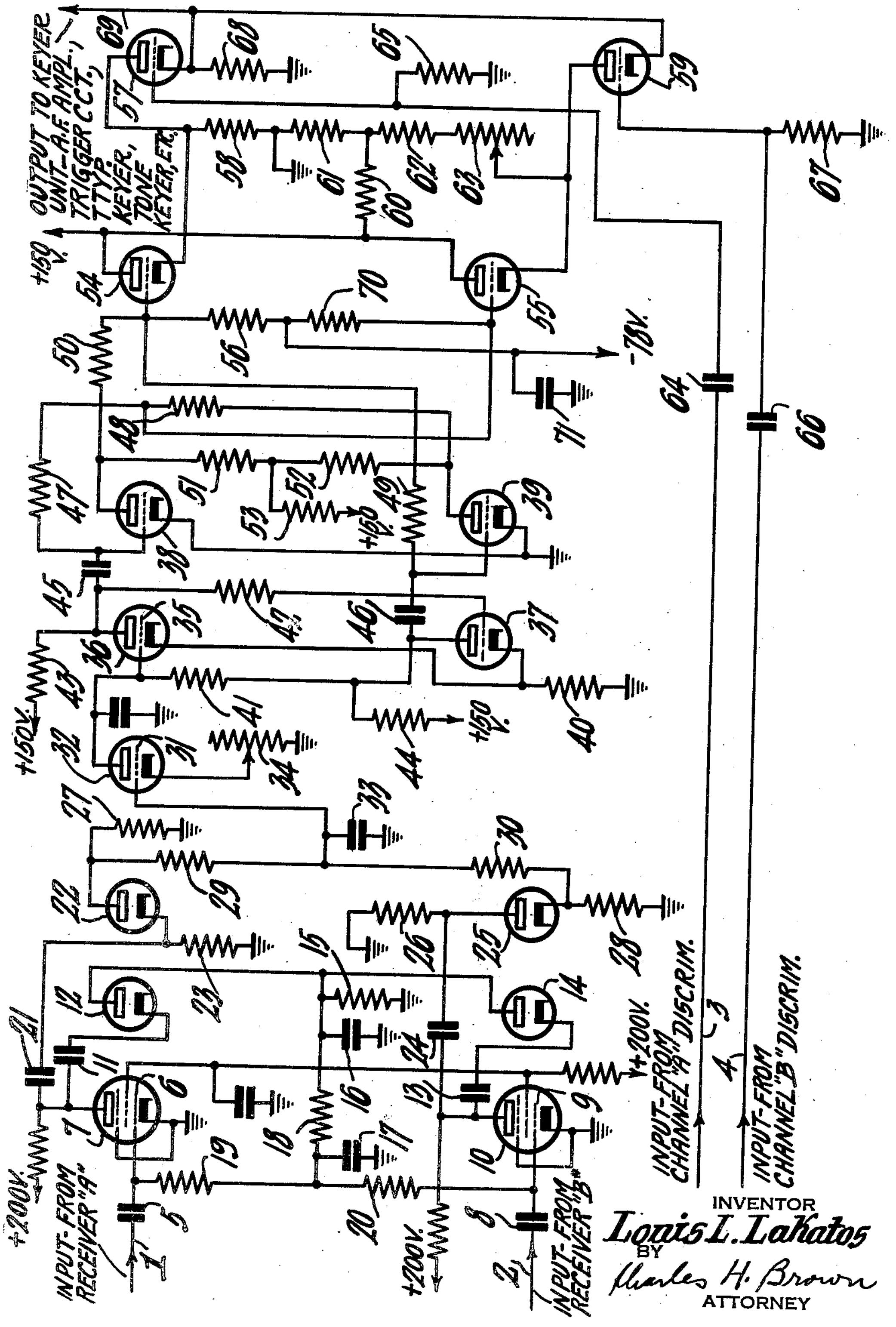
INVENTOR
Louis L. Lakatos
BY
Charles H. Brown
ATTORNEY Patented Mar. 17, 1953

2,632,104

UNITED STATES PATENT OFFICE 2,632,104

GATING CIRCUIT

Louis L. Lakatos, Philadelphia, Pa., assignor to Radio Corporation of America, a corporation of Delaware Application February 19, 1952, Serial No. 272,396

17 Claims. (Cl. 250—27)

This invention relates to a gating circuit, and more particularly to a gating circuit using cathode follower gating tubes. One of the many uses to which such a circuit may be put is in diversity receivers for frequency shift keyed (FSK) telegraph signals and the invention will be described herein in connection with this use. However, this particular use of the invention is given by way of example only, as the circuit of the invention may have other uses.

Frequency shift keyed signals may be considered frequency modulation signals because in these signals marking characters may be represented by current of one frequency and spacing characters by current of a frequency separated by several hundred cycles from said one frequency. Frequency shift keyed signals may be produced at the transmitter by keying an oscillator from a first frequency to a second frequency in accordance with signals, or by producing oscillations of different frequencies and keying the oscillations alternatively, or by modulating a low frequency oscillator between two frequencies and modulating a high frequency carrier by the modulated low frequency oscillations.

A certain known type of diversity receiving system includes means in each of the several diversity receivers which supplies what is called a gating potential to control a gating tube or valve in each of the receivers. A gating tube or valve couples the output of each diversity receiver to an output circuit which is common to all receivers. The valves or gates are so operated and controlled that the valve or gate for the receiver getting the best signal is opened to supply signal output from that receiver to the common output circuit, the remaining valves or gates being closed. The present invention is applicable to this broad class of diversity receiving systems.

For the frequencies ordinarily employed in frequency shift telegraphy, it is desirable to utilize coaxial cables for conducting the signals from one unit to another. For such cables, it is highly advantageous for the diversity switching or gating unit to have a low output impedance, in order to be able to effectively couple the cable to the diversity gating or diversity receiver selector unit.

Therefore, an object of this invention is to devise a novel gating arrangement which has a low output impedance.

In some frequency shift telegraph receivers, a switching arrangement is provided so that the system can be utilized for either single-channel (non-diversified) or multiple channel (diversified) reception. For example, the system might be utilized for single-channel reception when one receiver is out of order (assuming two-set or two-receiver diversity, for which the present arrangement is particularly adapted) or when for some reason diversity reception is not desired. When the changeover is made from single channel reception to diversity reception, or vice versa, it is quite desirable, in order to do away with extra switching operations, that no phase reversal be produced when the changeover is made. This requires that the gating system itself produce no phase reversal, between the input and output thereof.

Thus, another object of the present invention is to provide a novel gating arrangement in which no phase reversal is produced, between input and output of such arrangement.

A further object is to devise a novel type of cathode follower gate tube circuit, in which the control circuit for the gate tubes is separated from the signal circuit for such tubes, or in other words, in which the control and signal voltages are applied to different electrodes of the gate tubes. In this way, the control and signal circuits for the gates are effectively isolated from each other.

In the embodiment of the invention herein described in connection with a diversity receiver, the objects of the invention are accomplished in the following manner: The anode-cathode paths of two control triodes are connected in series between an anode supply source and the respective anodes of two gate triodes. Switching or control potentials, which may for example be diversity switching potentials, are applied to the grids of the respective control triodes and the two received detected signals are applied to the grids of the respective gate triodes. The common gated output is taken from across a common cathode load resistor for the gate tubes.

The foregoing objects as well as others will best be understood from the following description, reference being had to the accompanying drawing, wherein the single figure is a diagrammatic representation of a circuit arrangement embodying this invention.

Referring now to the drawing, in which the gating circuit of the invention is illustrated in use for a diversity gating system or circuit, two receivers A and B of a known diversity system are assumed to be supplying outputs at an intermediate frequency (I. F.) of 395 to 470 kc. ± F. S. or at an I. F. of 50 kc. ± F. S. by respective lines 1 and 2 (which may be concentric or coaxial) to the input of the diversity selector unit embodying the invention. Alternatively, the input supplied to lines 1 and 2 may be of audio frequency (A. F.), with either a 1,000-cycle or 2,550-cycle center frequency. The receivers used may, for example, be similar to those disclosed in Schock et al. Patent #2,515,668, dated July 18, 1950, and each may include a radio frequency amplifier, a high frequency oscillator and converter, and an I. F. oscillator and I. F. amplifier, if the input supplied to lines 1 and 2 is of I. F. The two receivers utilized are arranged in diversity relation with respect to a distant transmitting station, so that the inputs supplied to the unit of the invention are diversified received signal versions of a transmitted frequency shift telegraph signal. More specifically, the two receiving antennas for the respective A and B may be spaced from each other (thus being arranged in space diversity) or may be located at the same point and differently polarized (thus in polarization diversity), to pick up different versions of the frequency shift telegraph signal transmitted from the remote transmitting station. The circuit as stated hereinbefore is particularly adapted to frequency modulation of the type known as frequency shift telegraphy, in which the I. F. or A. F. input at lines 1 and 2 is shifted from one frequency representing mark (high frequency) to another frequency representing space separated from the first frequency by a predetermined number of cycles.

The I. F. or A. F. output of each receiver or channel is fed to a respective limiter (not shown) and a respective discriminator-detector (not shown) each of which latter units derives a pulsating waveform corresponding to the frequency shifts and supplies the same to respective lines 3 and 4, line 3 being supplied by the channel discriminator in receiver A and line 4 by the channel discriminator in receiver B. The limiters and discriminator-detectors referred to may be of any suitable design, or they may be of the type disclosed in the aforementioned Schock et al. patent, the type disclosed in said patent being particularly suitable when the receiver output is A. F.

The diversity selector unit of this version compares the channel A and channel B diversity control signals (supplied to lines 1 and 2) and permits the stronger signal to operate the gating circuit which switches the discriminator output of either channel A or channel B to the common output which goes to a following keyer unit.

The I. F. or A. F. signal on lead 1 is supplied through a coupling capacitor 5 to the control grid 6 of a pentode vacuum tube 7 connected as an amplifier. Tube 7 may be termed the channel A amplifier. The I. F. or A. F. signal on lead 2 is supplied through a coupling capacitor 8 to the control grid 9 of a pentode vacuum tube 10 connected as an amplifier. Tube 10 may be termed the channel B amplifier. A portion of the amplified output appearing at the anode of tube 7 is fed through a capacitor 11 to the cathode of an evacuated diode structure 12, to produce a rectified voltage of negative polarity at the anode of this diode structure. A portion of the amplified output appearing at the anode of tube 10 is fed through a capacitor 13 to the cathode of an evacuated diode structure 14, to produce a rectified voltage of negative polarity at the anode of this diode structure. The outputs of diodes 12 and 14 are combined across a common load resistor 15, one end of which is connected to the anodes of diodes 12 and 14 and the other end of which is grounded; the combined between the upper ends of capacitors 16 and 17 and returned to both grids 6 and 9 through resistors 18, 19 and 20, resistor 18 being connected between the upper end of capacitors 16 and 17 and resistors 19 and 20 being connected in series between grids 6 and 9 with the common junction of these resistors connected to the upper end of capacitor 17. The diode structures 12 and 14 are AVC rectifiers, and the combined output across resistor 15 is a voltage which provides amplifier AVC control which extends the operating range of the amplifier tubes 7 and 10 to accommodate approximately 50 db input range of signal amplitude.

The remainder of the amplified output at the anode of tube 7 is fed through a capacitor 21 to the cathode of an evacuated diode structure 22, a resistor 23 being connected from this cathode to ground. Diode structure 22 rectifies this remainder output to produce a negative voltage across a resistor 27 connected between the diode, anode and ground. The remainder of the amplified output at the anode of tube 10 is fed through a capacitor 24 to the anode of the evacuated diode structure 25, a resistor 26 being connected from this anode to ground. Diode structure 25 rectifies this remainder output to produce a positive voltage across a resistor 28 connected between the diode cathode and ground. The two rectified outputs of diodes 22 and 25 are combined across resistors 29 and 30 which are connected in series between the anode of diode 22 and the cathode of diode 25, these resistors completing the differential rectifier circuit the output of which is used to control the gating circuits. A negative voltage at the junction of resistors 29 and 30 indicates that the channel A signal is stronger than the channel B signal; conversely, a positive voltage indicates a reverse condition, that is, that the channel B signal is stronger than the channel A signal.

The output of the differential rectifier, which appears at the junction of resistors 29 and 30, is fed to the grid 31 of an evacuated triode structure 32 operating as a D. C. amplifier tube. A filter capacitor 33 is connected between the junction of resistors 29 and 30 and ground. A potentiometric resistor 34, which is connected between the cathode of tube 32 and ground, is a "control balancer" resistor, adjustment of which may be made to permit the gating circuits to switch channels with an equal change of input level for either channel.

The output of amplifier tube 32 (the voltage at its anode) is direct-coupled to the control grid 35 of a triode structure 36 which is one stage of a two-stage gate control circuit. Tubes 36 and 37 are included in the first stage of the two-stage gate control circuit. Each stage of the two-stage gate control circuit is a bistable locking circuit. Thus, triode structures 36 and 37 constitute one stage of the two-stage circuit, while triode structures 38 and 39, which are capacitively coupled to the first stage structures, constitute the second stage of the two-stage circuit. The two-stage gate control circuit is quite similar to the two-stage gate control in the aforementioned Schock et al. patent. More particularly, the cathodes of structures 36 and 37 are connected together and in turn connected to ground through a resistor 40. The grid 35 of tube 36 connects to the anode of tube 37 through a resistor 41; the grid of tube 37 connects to the anode of tube 36 through a resistor 42. The anodes of tubes 36 and 37 are connected to the positive terminal of a unidirectional source +150 v. through resistors 43 and 44, respectively. The anodes of tubes 36 and 37 are coupled by capacitors 45 and 46 to the grids of tubes 38 and 39, respectively. The cathodes of structures 38 and 39 are tied together and grounded. The grid of tube 38 connects to the anode of tube 39 through two series-connected resistors 47 and 48; the grid of tube 39 connects to the anode of tube 38 through two series-connected resistors 49 and 50. The anodes of tubes 38 and 39 are connected to the positive terminal of unidirectional source +150 v. through resistors 51 and 52, respectively, and through a common resistor 53.

Tubes 38 and 39, like tubes 36 and 37, have their anodes and grids cross-connected so that they form a locking circuit like tubes 36 and 37. In general, it may be stated that the arrangement is such that tubes 36 and 37 are alternatively conductive because when the anode potential of one thereof drops because of current flow therein, the grid of the other thereof becomes more negative to cut off current in the other tube. Thus, this arrangement constitutes a bistable locking circuit having two conditions or degrees of electrical stability. Likewise, it may be said that the tubes 36 and 38 are alternatively conductive because when the potential on the anode of tube 36 drops said drop appears on the grid of tube 38 through capacitor 45, thus decreasing the conductivity of tube 38 to reduce current flow therein. This reduction in tube current makes the anode of tube 38 more positive, and this increase in positive potential operates through the cross-coupling resistors to make the grid of tube 39 more positive so that more current flows therein and the tripping action takes place to cut off the current in tube 38. It may also be stated that tubes 36 and 39 are tripped in synchronism.

It will be noted that each of the two stages 36, 37 and 38, 39 constitutes a separate bistable locking circuit. The term "bistable locking circuit," as used herein, refers to a pair of electron discharge device structures having their anodes and grids cross-coupled or interconnected through resistors, that is, connected in a modified-multivibrator type of circuit, in such a way as to "lock" in either one of two conditions of electrical stability. In one condition of electrical stability, one discharge device is conducting and the other is non-conducting, and in the other condition the said one device is non-conducting and the said other device is conducting. Considering the first stage 36, 37 (the second stage 38, 39 operates similarly), said first stage remains in one condition (e. g., tube 36 conducting and tube 37 non-conducting) until it is tripped to the other condition (tube 36 non-conducting and tube 37 conducting) by an external signal; it then remains in this other or second condition until it is tripped back to the first condition (tube 36 conducting and tube 37 non-conducting) by another external signal. Thus, each stage "lock" in one condition or the other and is "stable" in either condition, hence it is "bistable." Each of the two stages is a "bistable locking circuit."

The locking circuit output, taken from the anodes of the second stage, is fed to the control grids of the gate-A control tube 54 and the gate-B control tube 55. More particularly, the grid of evacuated triode structure or electron discharge device structure 54 is direct-connected to the common junction of resistors 49 and 50, while the grid of evacuated triode structure or electron discharge device structure 55 is direct-connected to the common junction of resistors 47 and 48. A pair of resistors 56 and 70 are connected in series between the grids of tubes 54 and 55, the junction of these resistors being connected to a negative potential point of about 78 volts, this connection being made through a filter consisting of a capacitor 71 connected from the common resistor junction to ground. The purpose of this arrangement is to place the correct bias on the grids of tubes 54 and 55, by bucking out the high positive voltages from the anodes of tubes 38 and 39, to which anodes the grids of tubes 54 and 55 are D. C.-coupled.

As the potential on the grid 31 varies in selecting the best signal output (that from receiver A or that from receiver B) as determined by the differential rectifier including tubes 22 and 25, the locking circuit tube 36 is tripped one way or the other. The current passing conditions of the second locking tubes 38 and 39 reverse each time the current passing conditions of the first pair of locking tubes reverse.

When the second locking circuit 38, 39 is locked one way (tube 38 non-conducting and tube 39 conducting) a positive voltage appearing at the anode of tube 38 is applied to the grid of the gate-A control tube 54 and a negative voltage appearing at the anode of tube 39 is applied to the grid of the gate-B control tube 55. Tube 38 is non-conducting and tube 39 conducting when the channel A input signal level exceeds the channel B signal level, since when this is the case a negative voltage appears at the junction of resistors 29 and 30 (the channel A signal being rectified by diode 22 to produce a negative voltage which exceeds the positive rectified voltage developed by diode 25) resulting in a rise in voltage at the anode of tube 32, in turn tripping current through tube 36 and cutting off tubes 37 and 38 and tripping current through tube 39.

When the second trigger 38, 39 is locked the other way (tube 39 non-conducting and tube 38 conducting) a positive voltage appearing at the anode of tube 39 is applied to the grid of the gate-B control tube 55 and a negative voltage appearing at the anode of tube 38 is applied to the grid of the gate-A control tube 54. Tube 39 is non-conducting and tube 38 conducting when the channel B input signal level exceeds the channel A signal level, since when this is the case a positive voltage appears at the junction of resistors 29 and 30 (the channel B signal being rectified by diode 25 to produce a positive voltage which exceeds the negative rectified voltage developed by diode 22), causing a drop in voltage at the anode of tube 32, in turn cutting off tube 36, tripping current through tubes 37 and 38 and cutting off tube 39.

Thus, it may be seen that the control voltages applied to the grids of control tubes 54 and 55 are such as to render tube 54 conducting and tube 55 non-conducting, or vice versa. Tubes 54 and 55 are thus alternatively conductive.

The anodes of tubes 54 and 55 are connected together and to a positive unidirectional potential source. The cathode of tube 54 is connected directly to the anode of an evacuated triode structure 57 which is the gate tube or electronic valve for channel A. This same cathode is connected through a resistor 58 to ground. Thus, the anode potential for gate tube 57 is obtained via the anode-cathode path of gate-A control tube 54. The cathode of tube 55 is connected directly to the anode of an evacuated triode structure 59 which is the gate tube or electronic valve for channel B. The anodes of tubes 54 and 55 are connected through a pair of series-connected resistors 60 and 61 to ground, while from the junction of resistors 60 and 61 a connection extends to the cathode of tube 55 by way of a series resistor 62 and the movable tap on a potentiometric "gate balance" resistor 63. Thus, the anode potential for gate tube 59 is obtained via the anode-cathode path of gate-B control tube 55.

Line 3 is coupled through a coupling capacitor 64 to the grid of gate tube or gating device 57, so as to feed the output of the A channel discriminator (previously referred to) to such grid. A resistor 65 is connected from the grid side of capacitor 64 to ground. Line 4 is coupled through a coupling capacitor 66 to the grid of gate tube or gating device 59, so as to feed the output of the B channel discriminator (previously referred to) to such grid. A resistor 67 is connected from the grid side of capacitor 66 to ground. The gate tubes 57 and 59 are arranged as cathode followers, with a common output circuit, by tying the two cathodes thereof together and then to ground through a common cathode resistor 68; an output connection 69 is taken from the upper ungrounded end of this resistor. This output connection supplies gated output to a suitable utilization circuit, which may for example be a keyer unit including AF amplifying stages, a trigger circuit followed by keyers such as a teletypewriter keyer and/or a tone keyer.

In a manner to be described hereinafter, gate tubes 57 and 59 are made conducting alternatively. When gate tube 57 is conducting, the channel A discriminator output signal applied to its grid appears across cathode resistor 68 and is supplied as output from the circuit of this invention; at this time tube 59 is non-conducting and the channel B discriminator output signal does not appear across output resistor 68. When gate tube 59 is conducting, the channel B discriminator output signal applied to its grid appears across cathode resistor 68 and is supplied as output from the circuit of this invention; at this time tube 57 is non-conducting and the channel A discriminator output signal does not appear across output resistor 68.

As previously described, a control tube is in series with a gate tube for each of the two channels. When the grid of control tube 54 receives a positive voltage from the second locking circuit 38, 39 (as described, this occurs when the channel A input signal level exceeds the channel B signal level), current flows through control tube 54 and through the resistor 58 in its cathode circuit, developing a positive voltage at the cathode of tube 54 which is impressed on the anode of gate tube 57. Since the grid of tube 57 is at ground potential, this tube now conducts, permitting the input signal from channel A which is supplied to the grid of this tube to appear across the common cathode resistor 68 and be supplied to the output lead 69. As previously stated, when a positive voltage appears on the grid of control tube 54, a negative voltage appears on the grid of control tube 55. Such a condition stops current flow through control tube 55 and through the resistors 63, 62 and 61 in its cathode circuit, resulting in no anode voltage on gate-B tube 59. Since when there is no anode voltage no anode current can flow, the signal from channel B which is supplied to the grid of tube 59 cannot appear across the common cathode resistor 68.

When the grid of control tube 55 receives a positive voltage from the second locking circuit 38, 39 (as described, this occurs when the channel B input signal level exceeds the channel A signal level), current flows through control tube 55 and through the resistors 63, 62 and 61 in its cathode circuit, developing a positive voltage at the cathode of tube 55 which is impressed on the anode of gate tube 59. Since the grid of tube 59 is at ground potential, this tube now conducts, permitting the input signal from channel B which is supplied to the grid of this tube to appear across the common cathode resistor 68 and be supplied to the output lead 69. As previously stated, when a positive voltage appears on the grid of control tube 55, a negative voltage appears on the grid of control tube 54. Such a condition stops current flow through control tube 54 and through the cathode resistor 58, resulting in no anode voltage on gate-A tube 57. Since when there is no anode voltage no anode current can flow, the signal from channel A which is supplied to the grid of tube 57 cannot appear across the common cathode resistor 68.

In frequency shift telegraphy for teletype operation, with equipments wherein single channel or diversity reception is optional, it is important that no mark-space reversal occur when shifting from single channel to diversity or vice versa, particularly when the printer is operating, since such reversal will produce continuously erroneous copy. In the circuit of this invention, the gate tubes 57 and 59 are connected as cathode follower tubes; in cathode followers no phase reversal occurs between input and output, so that no phase reversal of the gated signal takes place. Therefore, with this invention no mark-space reversal occurs when shifting from single channel to diversity or vice versa.

Cathode follower tubes, such as gate tubes 57 and 59, have a low output impedance, so that the circuit of this invention provides the highly desirable low-output-impedance feature.

It will be noted that the gate control voltages, derived through control tubes 54 and 55, are applied to the anodes of gate tubes 57 and 59, while the signal voltages from the respective discriminators are applied to the grids of gate tubes 57 and 59. Thus, the control and signal circuits are separated or isolated from each other.

In frequency shift telegraph equipment wherein single channel or diversity reception is optional, it is also important that no appreciable change in D. C. output level occur when shifting from single channel to diversity or vice versa, since such change could introduce a limited number of errors into the received copy. The gain in the cathode follower gate tubes 57 and 59 is less than would be the gain in more conventional gate tube circuit arrangements. Thus, the change in gain level, when switching from single channel to diversity reception or vice versa, is very small, and as a result there is no appreciable change in D. C. output level when such switching takes place.

The "gate balance" control resistor 63 may be adjusted to vary the anode voltage on tube 59, since it is the IR voltage drop across resistors 63, 62 and 61 which determines the anode voltage on said tube. The resistor 63 may be adjusted in such a way as to compensate for differences in gain of the two gate tubes 57 and 59. When the balance adjustment is proper, the anode voltage pulse created by the switching action of the control tubes 54 and 55 is effectively cancelled in the common cathode resistor 68. In this way, diversity switching transients may be effectively eliminated.

It is desired to be pointed out that gating action is possible with the circuit of this invention even if resistors 58 and 61—63 are removed from the circuit. In this case, the anode voltage necessary to cause conduction in one or the other of the gate tubes would be developed across the internal anode-cathode resistance of the respective one of the control tubes 54 or 55.

The following tabulation of component values is given for a circuit arrangement embodying the present invention which was built and successfully tested. These values are given merely by way of illustration and the invention is not to be deemed limited in any way thereby.

| | |
|---|---|
| Tube 7 | 6AU6 |
| Tube 10 | 6AU6 |
| Tube 12 | ½ 6AL5 |
| Tube 14 | ½ 6AL5 |
| Tube 22 | ½ 6AL5 |
| Tube 25 | ½ 6AL5 |
| Tube 32 | 6C4 |
| Tube 36 | ½ 12AU7 |
| Tube 37 | ½ 12AU7 |
| Tube 38 | ½ 12AU7 |
| Tube 39 | ½ 12AU7 |
| Tube 54 | ½ 12AU7 |
| Tube 55 | ½ 12AU7 |
| Tube 57 | ½ 12AU7 |
| Tube 59 | ½ 12AU7 |
| Resistor 15 | 270,000 ohms |
| Resistor 18 | 1 megohm |
| Resistor 19 | 1 megohm |
| Resistor 20 | 1 megohm |
| Resistor 23 | 270,000 ohms |
| Resistor 26 | 270,000 ohms |
| Resistor 27 | 470,000 ohms |
| Resistor 28 | 470,000 ohms |
| Resistor 29 | 1 megohm |
| Resistor 30 | 1 megohm |
| Resistor 34 | 5,000 ohms |
| Resistor 40 | 18,000 ohms |
| Resistor 41 | 150,000 ohms |
| Resistor 42 | 150,000 ohms |
| Resistor 43 | 10,000 ohms |
| Resistor 44 | 10,000 ohms |
| Resistor 47 | 1 megohm |
| Resistor 48 | 1 megohm |
| Resistor 49 | 1 megohm |
| Resistor 50 | 1 megohm |
| Resistor 51 | 100,000 ohms |
| Resistor 52 | 100,000 ohms |
| Resistor 53 | 10,000 ohms |
| Resistor 56 | 680,000 ohms |
| Resistor 58 | 4,747 ohms |
| Resistor 60 | 751,200 ohms |
| Resistor 61 | 47 ohms |
| Resistor 62 | 470 ohms |
| Resistor 63 | 10,000 ohms |
| Resistor 65 | 1 megohm |
| Resistor 67 | 1 megohm |
| Resistor 68 | 56,000 ohms |
| Resistor 70 | 680,000 ohms |
| Capacitor 5 | .01 mfd. |
| Capacitor 8 | .01 mfd. |
| Capacitor 11 | 680 mmfd. |
| Capacitor 13 | 680 mmfd. |
| Capacitor 16 | 1,000 mmfd. |
| Capacitor 17 | 1,000 mmfd. |
| Capacitor 21 | .01 mfd. |
| Capacitor 24 | .01 mfd. |
| Capacitor 33 | 680 mmfd. |
| Capacitor 45 | 1,000 mmfd. |
| Capacitor 46 | 1,000 mmfd. |
| Capacitor 64 | 1 mfd. |
| Capacitor 66 | 1 mfd. |
| Capacitor 71 | 1 mfd. |

What is claimed is:

1. In a gating circuit, a pair of electronic valves each having at least anode, cathode and grid electrodes, means for applying a pair of signals to be gated each to a respective grid electrode, a common cathode impedance coupled to both cathode electrodes, means for utilizing the voltage developed across said common impedance, and separate but interrelated controllable means for alternatively applying energizing potentials to said anode electrodes, thereby to cause said valves to alternatively conduct, each valve conducting in response to the application of an energizing potential to its own anode electrode.

2. A gating circuit in accordance with claim 1, wherein each controllable means includes the anode-cathode path of a respective electron discharge device connected in series between a source of unidirectional potential and a corresponding electronic valve anode electrode.

3. In signalling apparatus, in combination, a plurality of signal receivers, means for comparing the relative strengths of the plurality of signals received and for producing a potential the polarity of which is positive or negative with respect to a reference level depending upon which received signal is stronger, an electronic valve for each receiver, each of said valves having at least cathode and grid electrodes and one other electrode, means for applying each received signal to a separate corresponding one of said grid electrodes, means for deriving from said potential a plurality of control potentials equal in number to the number of said valves, means for applying each control potential to a separate corresponding one of said other electrodes to make one valve conductive to pass the stronger signal and to make the remaining valves non-conductive, a common cathode impedance coupled to the cathode electrodes of all of said valves, and means for utilizing the voltage developed across said common impedance.

4. Apparatus in accordance with claim 3, wherein the said other electrodes of the electronic valves are the anodes and wherein the control potentials are energizing potentials.

5. Apparatus in accordance with claim 3, wherein the means for deriving includes a separate electron discharge device structure for each electronic valve, the anode-cathode path of each structure being connected in series between a source of unidirectional potential and a respective one of said other electrodes.

6. Apparatus in accordance with claim 3, wherein the said other electrodes of the electronic valves are the anodes, wherein the control potentials are energizing potentials and wherein the means for deriving includes a separate electron discharge device structure for each electronic valve, the anode-cathode path of each structure being connected in series between a source of unidirectional potential and a respective one of said other electrodes.

7. Apparatus in accordance with claim 6, wherein each electron discharge device structure includes a control electrode and wherein the potentials of opposite senses derived from said produced potential are applied to the respective control electrodes.

8. In signalling apparatus, in combination, two signal receivers, means for comparing the relative strengths of the two signals received and for producing a potential the polarity of which is positive or negative with respect to a reference level depending upon which received signal is stronger, an electronic valve for each receiver, each of said valves having at least cathode and grid electrodes and one other electrode, means for applying each received signal to a separate corresponding one of said grid electrodes, a trigger circuit, having two conditions of electrical stability and comprising a pair of intercoupled electrode structures, so arranged that the flow of current in one structure causes a cessation of current in the other structure, and vice versa, means for applying said potential to said trigger circuit to trip the same from one condition to the other, and vice versa, in response to a change in the polarity of said potential, means coupling each of the trigger circuit structures to a separate corresponding one of said other electrodes so that the control potential applied to each of said other electrodes by way of said coupling means is controlled by current flow in its corresponding trigger structure, a common cathode impedance coupled to the cathode electrodes of both of said valves, and means for utilizing the voltage developed across said common impedance.

9. Apparatus in accordance with claim 8, wherein the said other electrodes of the electronic valves are the anodes and wherein the control potentials are energizing potentials.

10. Apparatus in accordance with claim 8, wherein the coupling means includes a separate electron discharge device structure for each electronic valve, the anode-cathode path of each such structure being connected in series between a source of unidirectional potential and a respective one of said other electrodes.

11. Apparatus in accordance with claim 8, wherein the coupling means includes a separate electron discharge device structure for each electronic valve, the anode-cathode path of each such structure being connected in series between a source of unidirectional potential and a respective one of said other electrodes, wherein each discharge device structure includes a control electrode and wherein each of the trigger structures is coupled to a separate corresponding one of said control electrodes.

12. Apparatus in accordance with claim 11, wherein the said other electrodes of the electronic valves are the anodes and wherein the control potentials are energizing potentials.

13. In combination, an electronic valve having at least cathode and grid electrodes and one other electrode, means for applying a signal to said grid electrode, a cathode impedance coupled to said cathode electrode, means for utilizing the voltage developed across said impedance, and controllable means for applying a control potential to said other electrode, thereby to cause said valve to conduct in response to the application of said potential and to cause said signal to produce a voltage across said impedance.

14. The combination defined in claim 13, wherein the said other electrode of the electronic valve is the anode and wherein the control potential is an energizing potential.

15. The combination defined in claim 13, wherein the controllable means includes the anode-cathode path of an electron discharge device structure connected in series between a source of unidirectional potential and the said other electrode of the electronic valve.

16. In a gating circuit, an electronic valve having at least cathode and grid electrodes and one other electrode, means for applying a signal to be gated to said grid electrode, a cathode impedance coupled to said cathode electrode, means for utilizing the voltage developed across said impedance, and controllable means for applying a control potential to said other electrode, thereby to cause said valve to conduct in response to the application of said potential, said last-named means including the anode-cathode path of an electron discharge device structure connected in series between a source of unidirectional potential an the said other electrode of the electronic valve.

17. In a gating circuit, an electronic valve having at least cathode and grid electrodes and one other electrode, means for applying a signal to be gated to said grid electrode, a cathode impedance coupled to said cathode electrode, means for utilizing the voltage developed across said impedance, an electron discharge device structure having an anode, a cathode and a control electrode, means coupling the anode-cathode path of said structure in series between a source of unidirectional potential and the said other electrode of the electronic valve, and means for applying a control voltage to said control electrode.

LOUIS L. LAKATOS.

REFERENCES CITED

The following references are of record in the file of this patent:

UNITED STATES PATENTS

| Number | Name | Date |
|---|---|---|
| 2,454,191 | MacDonald | Nov. 16, 1948 |
| 2,570,225 | Felker | Oct. 9, 1951 |